(12) United States Patent
Smith et al.

(10) Patent No.: US 11,542,089 B2
(45) Date of Patent: Jan. 3, 2023

(54) PACKAGING MATERIALS

(71) Applicant: JOHNSON MATTHEY PUBLIC LIMITED COMPANY, London (GB)

(72) Inventors: Andrew William John Smith, Berkshire (GB); Andrew Cornish, Berkshire (GB); Han Xu, Berkshire (GB); Jhonny Rodrigues Ramos, Berkshire (GB)

(73) Assignee: Johnson Matthey Public Limited Company, London (GB)

( * ) Notice: Subject to any disclaimer, the term of this patent is extended or adjusted under 35 U.S.C. 154(b) by 588 days.

(21) Appl. No.: 16/604,344

(22) PCT Filed: Apr. 10, 2018

(86) PCT No.: PCT/GB2018/050944
§ 371 (c)(1),
(2) Date: Oct. 10, 2019

(87) PCT Pub. No.: WO2018/189518
PCT Pub. Date: Oct. 18, 2018

(65) Prior Publication Data
US 2020/0156849 A1 May 21, 2020

(30) Foreign Application Priority Data

Apr. 11, 2017 (GB) .................. 1705796

(51) Int. Cl.
*B01J 20/18* (2006.01)
*B01J 20/28* (2006.01)
(Continued)

(52) U.S. Cl.
CPC ............ *B65D 81/266* (2013.01); *A23B 7/152* (2013.01); *A23L 3/3427* (2013.01); *B01D 53/02* (2013.01);
(Continued)

(58) Field of Classification Search
CPC .................. A23B 7/152; A23L 3/3427; A23V 2002/00; B65D 81/266; B01D 53/02; B01D 53/04;
(Continued)

(56) References Cited

U.S. PATENT DOCUMENTS 7,387,205 B1 * 6/2008 Wilson ................. B65D 81/268
206/524.4
2004/0156918 A1 * 8/2004 Podhajny ................. A23L 3/358
424/618

(Continued)

FOREIGN PATENT DOCUMENTS

JP H03280827 A 12/1991
WO 2007052074 A2 5/2007
(Continued)

OTHER PUBLICATIONS

Machine-generated English translation of JP H03-280827 A, published Dec. 1991.*
(Continued)

*Primary Examiner* — Frank M Lawrence, Jr.
(74) *Attorney, Agent, or Firm* — BakerHostetler

(57) ABSTRACT

The use of a palladium-doped zeolite for the adsorption of volatile organic compounds is described wherein the zeolite has a CHA framework type and is polymer-bound. Such zeolites have been found to have particular utility as packaging materials for the adsorption of volatile organic compounds, such as those originating from organic matter.

15 Claims, 2 Drawing Sheets

(51) Int. Cl.
  *B01D 53/04* (2006.01)
  *B65D 81/26* (2006.01)
  *A23B 7/152* (2006.01)
  *A23L 3/3427* (2006.01)
  *B01D 53/02* (2006.01)
  *B01J 20/26* (2006.01)

(52) U.S. Cl.
  CPC .............. *B01D 53/04* (2013.01); *B01J 20/18* (2013.01); *B01J 20/261* (2013.01); *B01J 20/28026* (2013.01); *A23V 2002/00* (2013.01); *B01D 2253/1085* (2013.01); *B01D 2253/25* (2013.01); *B01D 2257/708* (2013.01); *B01D 2259/4525* (2013.01)

(58) Field of Classification Search
  CPC ...... B01D 2253/108; B01D 2253/1085; B01D 2253/25; B01D 2257/708; B01D 2259/4525; B01J 20/165; B01J 20/18; B01J 20/186; B01J 20/261; B01J 20/28026
  USPC ........ 96/153, 154; 95/143, 144; 502/60, 400
  See application file for complete search history.

(56) References Cited

U.S. PATENT DOCUMENTS

| | | | |
|---|---|---|---|
| 2006/0272508 A1* | 12/2006 | Hoke | B01D 53/0415 96/134 |
| 2008/0287707 A1* | 11/2008 | Ilkenhans | B01J 20/28035 585/820 |
| 2011/0072967 A1* | 3/2011 | Wood | C09D 105/16 96/135 |
| 2011/0300768 A1* | 12/2011 | Gurudatt | B65D 81/28 427/372.2 |
| 2012/0160100 A1 | 6/2012 | Rowsell et al. | |
| 2013/0131232 A1 | 5/2013 | Sooknoi et al. | |
| 2015/0158019 A1* | 6/2015 | Rajaram | B01J 29/44 422/171 |
| 2016/0151761 A1* | 6/2016 | Smith | B01J 37/0219 502/62 |
| 2019/0225404 A1* | 7/2019 | Tatlock | B32B 27/12 |
| 2020/0148449 A1* | 5/2020 | Smith | B65D 81/267 |
| 2021/0053007 A1* | 2/2021 | Ashfield | C09D 183/04 |

FOREIGN PATENT DOCUMENTS

| | | |
|---|---|---|
| WO | 2011001186 A1 | 1/2011 |
| WO | 2014207467 A1 | 12/2014 |
| WO | 2016125050 A1 | 8/2016 |
| WO | 2016181132 A1 | 11/2016 |

OTHER PUBLICATIONS

GB1705796.9, Search Report Under Section 17(5) dated Oct. 10, 2017.
PCT/GB2018/050944, International Search Report dated Jul. 13, 2018.
PCT/GB2018/050944, Written Opinion dated Jul. 13, 2018.

* cited by examiner

FIG. 3
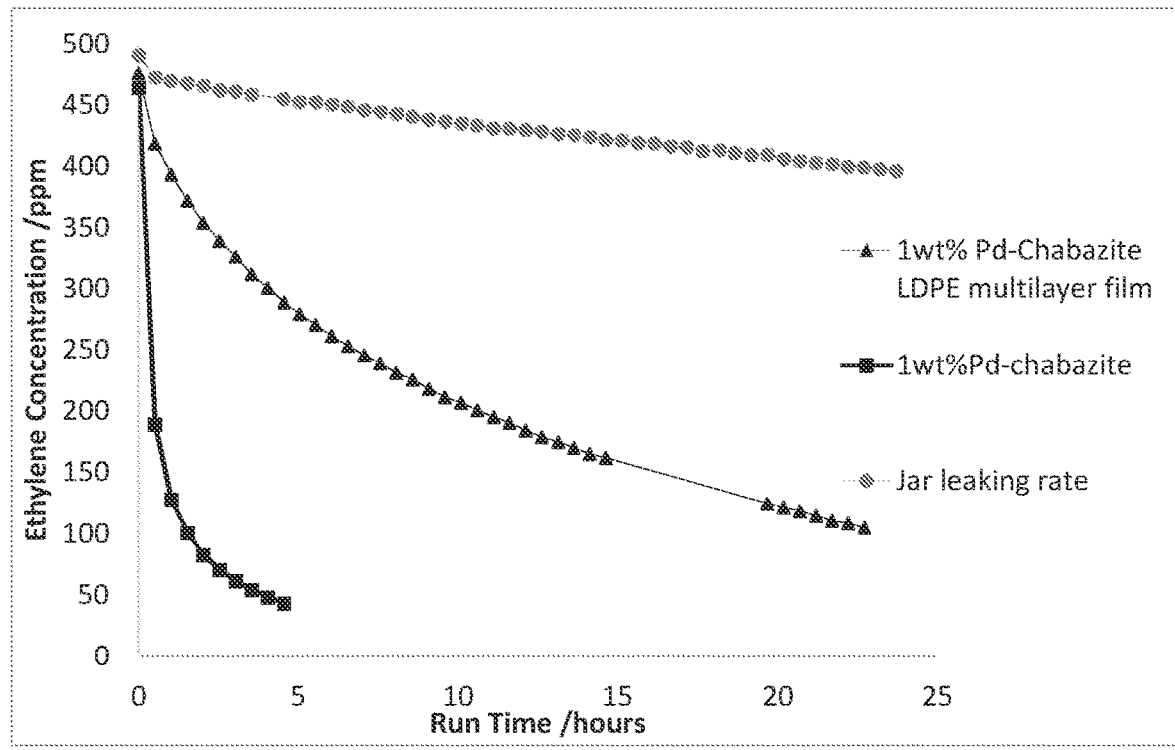
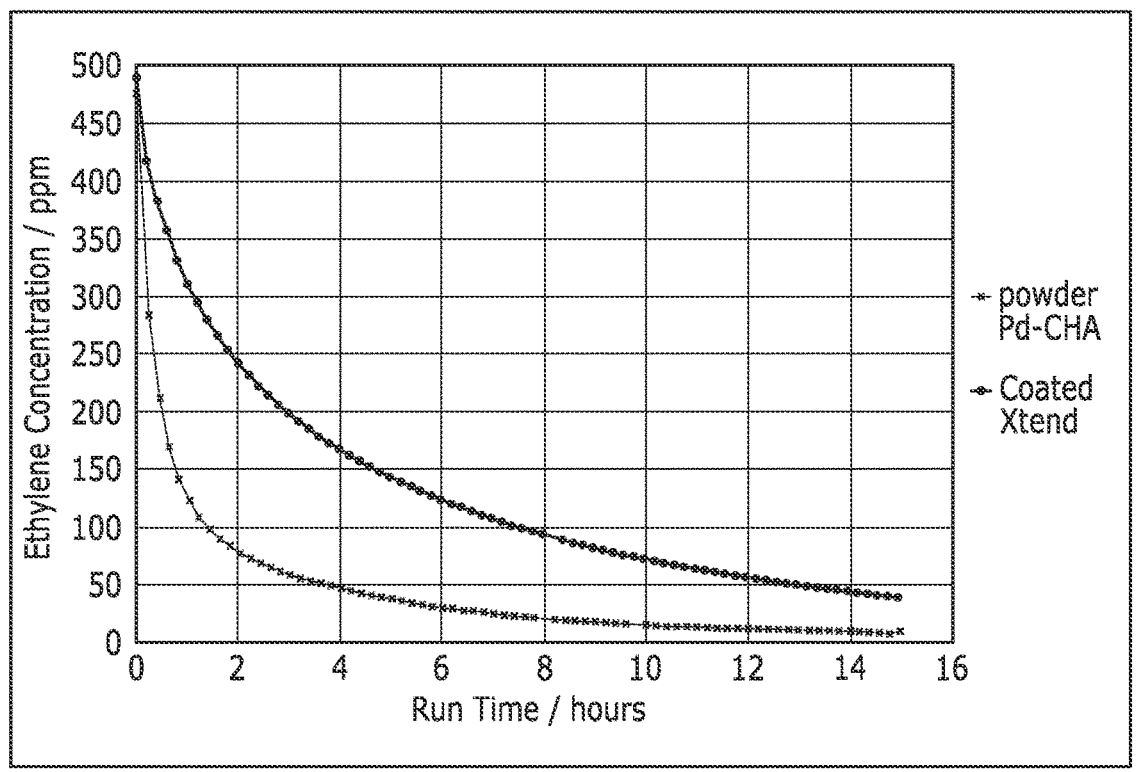
FIG. 4

PACKAGING MATERIALS

CROSS-REFERENCE TO RELATED APPLICATIONS

This application is the National Stage of International Patent Application No. PCT/GB2018/050944, filed Apr. 10, 2018, which claims priority to Great Britain Patent Application No. 1705796.9 filed Apr. 11, 2017, the entire disclosures of both of which are incorporated herein by reference for any and all purposes.

FIELD OF THE INVENTION

This invention relates to the adsorption of volatile organic compounds (VOCs) using polymer-bound palladium-doped zeolites. In particular, the present invention provides the use of polymer-bound palladium-doped zeolites to adsorb VOCs originating from organic matter, and packaging materials and inks suitable for this purpose.

BACKGROUND TO THE INVENTION

The over-ripening or spoiling of fruit, vegetables and other organic matter during transit or storage can lead to significant produce loss and wastage. This is an increasing issue for those involved in fresh produce supply chains which may involve long transit times and variable climatic conditions. Modification of the atmosphere in which the organic matter is stored has been shown to be an effective strategy to prolong produce life. For example, alterations in oxygen and carbon dioxide levels within produce packaging can reduce produce respiration rates and therefore slow down the spoiling of fresh produce.

Other strategies involve the removal of volatile organic compounds (VOCs) from within, or surrounding, the produce packaging. VOCs are typically emitted by the produce itself, or may be present in the environment in which the produce is stored or transported. The presence of such VOCs can, for example, accelerate the spoiling of produce, lead to unwanted odours or tastes, or produce colour changes or other changes in appearance.

One such VOC is ethylene. Ethylene is a plant hormone and has a key role in many physiological processes in plants. For example, exogenous ethylene can initiate fruit ripening which in turn can lead to release of ethylene as the fruit ripens leading to high local concentrations. Other fresh produce types are also sensitive to ethylene even if their own ethylene production is low. The rate of ethylene generation can be a key factor in determining local ethylene concentrations, and this rate varies significantly between produce types. Excessive ethylene levels can lead to, for example, the premature ripening of fruit and vegetables, the wilting of fresh flowers, and the loss of green colour and an increase in bitterness of vegetables.

The control of ambient ethylene levels has been found to be effective in prolonging the shelf-life of many horticultural products, and various methods of ethylene control are utilised commercially. Methods include those based on ethylene adsorption and oxidation, for example the use of potassium permanganate.

Palladium-doped zeolites have been found to act as ethylene adsorbents. For example, it is described in WO2007/052074 (Johnson Matthey Public Limited Company) that palladium-doped ZSM-5 may be used to adsorb VOCs, such as ethylene, which are derived from organic matter.

Adsorbents used to remove VOCs are typically used in the form of a powder or as granules. In the case of use within a fresh produce package the adsorbent material is typically incorporated into a label attached to the inside of the package, or may be contained within a sachet, pad or other insert located within the package.

WO2014207467A1 (Johnson Matthey Public Limited Company) describes a water-resistant composition for adsorbing VOCs comprising palladium-doped hydrogen ZSM-5 and at least one water soluble binder. Compositions are prepared and applied to Tyvek® paper.

It would be advantageous to incorporate the adsorbent materials into packaging materials as an alternative to providing the adsorbent inside a sachet, pad or other type of insert. In this case the adsorbent material would be more widely dispersed within the package and could be protected from direct contact with water. Furthermore, if the adsorbent material is combined with primary packaging there is no need for an additional insert or inserts to be placed inside the packaging. These advantages could lead to less adsorbent material being included, reduced packaging material, and fewer processing steps.

WO2016181132A1 (Innovia Films Ltd, Food Freshness Technology Holdings Ltd) describes a film for use in a packaging structure which comprises a coating on the film surface which comprises a binder and a particulate protuberent component able to remove VOCs. The examples describe the use of a palladium-doped zeolite as the protuberent component and ZSM-5 is mentioned.

The combination of adsorbent and polymeric materials remains a challenge, as binding of adsorbent materials with polymeric materials typically leads to a significant loss of adsorbent capacity and/or rate of adsorption, leading to poor performance. Resulting materials may also suffer from low stability. There remains a need to develop additional materials incorporating adsorbents which are suitable for use with fresh produce, for example as packaging films or other packaging materials.

SUMMARY OF THE INVENTION

It has been surprisingly found that palladium-doped zeolites with a CHA framework-type may be combined with polymeric materials and retain a significant proportion of VOC adsorption capacity, whilst maintaining a rate of removal such that the combined materials are suitable for use as packaging materials with a range of produce types. It has also been found that stable polymeric films may be prepared which comprise these zeolite materials. Such films and other packaging materials may provide benefits including the extension of shelf life and the reduction of fresh produce spoilage.

Therefore, in a first aspect of the invention, there is provided the use of a palladium-doped zeolite for the adsorption of volatile organic compounds, in particular volatile organic compounds originating from organic matter, wherein the zeolite has a CHA framework type and is polymer-bound.

In a second aspect of the invention, there is provided a method for adsorbing volatile organic compounds, in particular volatile organic compounds originating from organic matter, comprising the step of contacting the compounds with a zeolite with a CHA framework type and which is polymer-bound.

In a third aspect of the invention there is therefore provided a packaging material for the adsorption of volatile organic compounds, in particular volatile organic compounds originating from organic matter, the packaging material comprising a palladium-doped zeolite, wherein the zeolite has a CHA framework type. Preferably, the polymeric material is a packaging film.

Preferably, the packaging materials comprise a polymer film layer and particles of the zeolite are dispersed in the polymer film layer. Such film layers are obtainable by a compounding and extrusion process and it has been surprisingly found by the inventors that zeolites with a CHA framework type have an unexpectedly high retention of adsorption capacity despite the polymer processing conditions which are used to form the polymer film layer, which include high temperatures and grinding of the adsorbent with the polymeric material.

The compounded mixture may be isolated as a masterbatch prior to extrusion. Isolating a masterbatch can help facilitate transportation and storage of the adsorbent material, and simplify manufacturing of the packaging materials. Therefore, in a further aspect of the invention there is provided a masterbatch comprising a polymer and particles of a palladium-doped zeolite, wherein the zeolite has a CHA framework type.

Packaging materials may also be produced by the application of a coating onto a surface of the packaging material, such as a polymer film, the coating comprising a polymeric binder, and particles of the zeolite. Therefore, in another aspect of the invention there is provided an ink for application to a packaging material, the ink comprising palladium-doped zeolite particles and a polymeric binder, wherein the zeolite has a CHA framework type.

The packaging materials as described herein may be used to form a packaging structure. The materials may be used to seal a packaging structure, for example to seal a punnet, box or bottle, or may, for example, form the majority of the packaging structure, such as in the case of a bag or wrap.

BRIEF DESCRIPTION OF THE FIGURES

FIG. 3 shows the results of ethylene adsorption testing of a LDPE film incorporating 1% Pd-doped chabazite.

FIG. 4 shows the results of ethylene adsorption testing of a PVP coating incorporating 1% Pd-doped chabazite applied to a polyamide film.

DETAILED DESCRIPTION OF THE INVENTION

Figure 1:
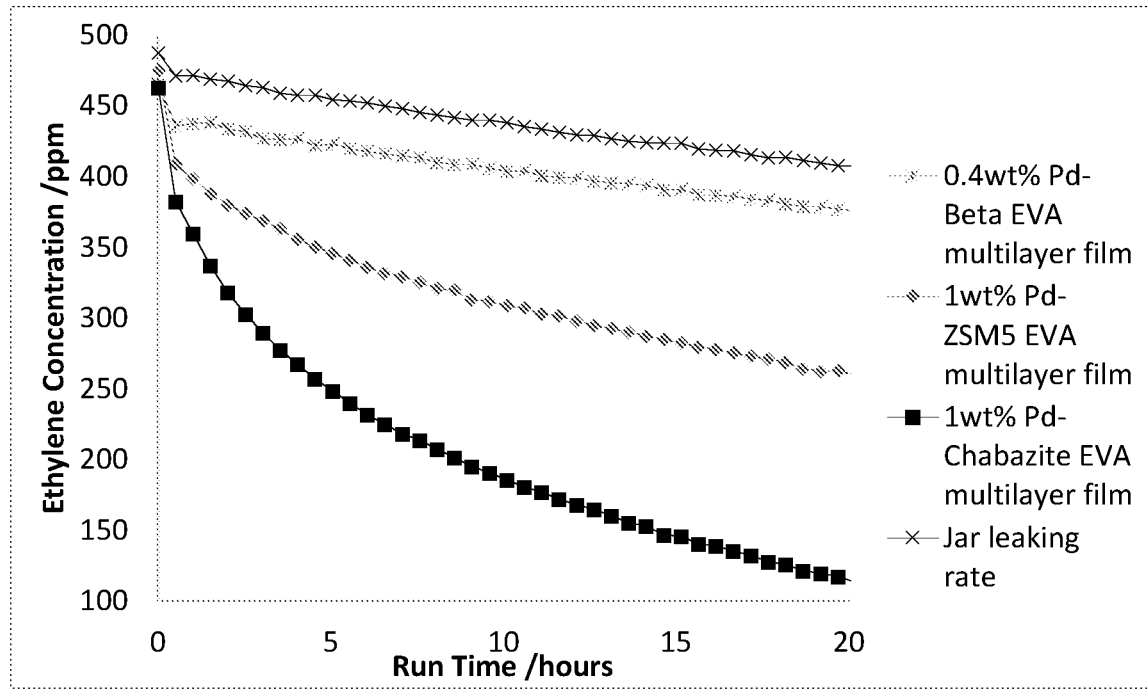
FIG. 1 shows the results of ethylene adsorption testing of polymer films incorporating Pd-doped zeolite particles with different framework types.

The invention relates to polymer-bound zeolites with a CHA framework type and their utility for the adsorption of VOCs. The CHA three-letter code represents a framework type in accordance with the "IUPAC Commission on Zeolite Nomenclature" and/or the "Structure Commission of the International Zeolite Association".

It will be understood that the zeolites may include regions in which the framework is a CHA/AEI mixture or intergrowth, however it is generally preferred that the zeolite has a framework that does not include an intergrowth of CHA and another framework type.

The zeolite typically has a silica to alumina molar ratio (SAR) of less than or equal to 100:1, such as between 10:1 and 50:1, preferably 10:1 to 40:1, more preferably 20:1 to 30:1.

The described zeolites have been found to retain a significant proportion of ethylene adsorption capacity when polymer-bound. The term polymer-bound will be understood by the skilled person to mean that to that the zeolite is embedded in or encapsulated by a polymeric material. Preferably, the zeolite material is encapsulated by a polymeric material providing protection from contact with water.

The zeolite framework may be counterbalanced by cations, such as by cations of alkali and/or alkaline earth elements (e.g. Na, K, Mg, Ca, Sr, and Ba), ammonium cations and/or protons. Preferably, the zeolite is in the hydrogen form.

The zeolite is doped with palladium, and typically comprises 0.1 to 10 wt % palladium based on the total weight of doped zeolite, preferably 0.2 to 2 wt %, 0.3 to 1.8 wt %, 0.3 to 1.6 wt %, 0.3 to 1.4 wt %, more preferably 0.3 to 1.2 wt %, 0.4 to 1.2 wt %, 0.6 to 1.2 wt %, or 0.8 to 1.2 wt %.

Such zeolites are typically prepared by incipient wetness impregnation using a palladium nitrate solution, drying the particles, and then calcining at a temperature between 450 and 750° C.

The zeolite particles may be dispersed in a polymer film. Suitable polymeric materials include polyvinyl chlorides, polyethylenes, polypropylenes, ethylene-vinyl acetate co-polymers, polystyrenes, polybutylenes, polycarbonates, polyesters, polyethylene terephthalates and mixtures, blends and co-polymers thereof. Preferably, the polymer is an ethylene vinyl acetate co-polymer, a low-density polyethylene, a high-density polypropylene, a polypropylene, or a high impact polystyrene. More preferably, the polymer is an ethylene vinyl acetate copolymer or low-density polyethylene Preferably, polymers, or mixtures of polymers, are selected which have high gas permeability so that the polymeric material is not detrimental to VOC adsorption rate. The gas permeation rate is a measure of the extent to which a material can act as a barrier to a gas. One known unit for the gas permeation rate of a polymer is cubic centimetres of a gas at standard temperature and pressure passing through a one-micron film, with an area of a square metre, over a period of one hour, with a partial pressure differential of the gas of one standard atmosphere. This known unit is abbreviated as $cm^3 \cdot \mu m/m^2 \cdot h \cdot atm$. The gas permeation rate is temperature dependent. One known convention for testing of films is to test at 25° C. and 0% relative humidity (RH). The permeation rate for a given polymer also depends on the gas itself. It has been found that the permeation rate of carbon dioxide is a good surrogate for VOCs, in particular ethylene. Therefore, preferably the polymer film layer comprises a polymer, or mixture of polymers, with a carbon dioxide permeability rate of >1.00e+02 $cm^3 \cdot \mu m/m^2 \cdot h \cdot atm$ at 25° C. and 0% RH, more preferably >1.00e+04 $cm^3 \cdot \mu m/m^2 \cdot h \cdot atm$. The carbon dioxide transmission rate through a film may be measured using standard methods such as ASTM F 2478 'Standard Test Method for the Determination of Carbon Dioxide Gas Transmission Rate ($CO_2TR$) Through Barrier Materials Using An Infrared Detector'. The carbon dioxide permeation rate is the $CO_2TR$ normalised to the material thickness and pressure gradient.

Such films are obtainable by a polymer extrusion process, the process comprising the steps of (i) compounding at least one polymer and particles of a palladium-doped zeolite with a CHA framework type; (ii) extruding the compounded mixture to form the polymer film. The selected polymeric materials are compounded with the palladium-doped zeolite particles using, for example, a twin screw extruder. The films are then produced by extrusion, for example by blown film or cast film extrusion.

It has been found that the maintaining a relatively low temperature during the compounding and/or extrusion steps can be advantageous with regards to retention of VOC adsorption capacity of the zeolite material. Typically, the compounding and/or extrusion steps may be carried out at a temperature of less than 200° C., such as between 120° C. and 180° C. For example, if the polymer material is an ethylene-vinyl acetate copolymer the temperature of the compounding and/or extrusion steps is typically between 120° C. and 180° C., preferably between 120° C. and 170° C., more preferably between 120° C. and 150° C., even more preferably between 120° C. and 140° C. If the polymer material is a low-density polyethylene then the temperature of the compounding and/or extrusion steps is typically between 150° C. and 190° C., preferably between 150° C. and 180° C., more preferably between 150° C. and 170° C.

It will be understood by the skilled person that the compounded mixture may be isolated as a masterbatch prior to film formation. The compounded material is typically pelletized as part of this process. The formation of masterbatch may be advantageous, for example to facilitate transportation of the adsorbent and to enable production of the packaging films using standard polymer processing facilities.

The masterbatch typically contains zeolite particles in the range 1-50 wt % based on the total weight of the masterbatch material.

Polymer films as described herein are then obtainable by extruding the masterbatch, with or without the addition of further polymeric material depending on the desired loading of palladium-doped zeolite in the formed film. Suitable extrusion processes include blown film or cast film extrusion.

Typically, the extruded polymer film will have a thickness of between 2 to 100 µm, preferably 5 to 30 µm. The palladium-doped zeolite particles are dispersed in the polymer film, typically at a zeolite loading of 1 to 50 wt % based on total weight of polymer film, preferably at a zeolite loading of 1 to 10 wt % based on total weight of polymer film.

The zeolite material is preferably provided in the form of particles, which typically have a size (d50) of 1 µm to 25 µm, preferably 5 and 10 µm. The particle size distribution of particles dispersed in the film may be measured, for example, by scanning electron microscopy.

As an alternative to dispersion in a polymer film, the zeolite particles may be incorporated in a coating on a surface of a packaging material, such as a polymer film, or a lid for a container, such as a bottle lid or the lid of a clamshell box, or a packaging insert, such as a strip or pad, for example a Tyvek® strip. Such a coating comprises a polymeric binder and zeolites particles.

The coating may be applied, for example, to the packaging material surface using a water-based ink which is then dried. In such cases a water-soluble binder may be used, for example a polvinylpyrrolidone. Preferably, the ink comprises a water-soluble binder and particles of palladium-doped zeolite with a CHA framework type in water. The weight ratio of palladium-doped zeolite to water-soluble binder in the ink is typically 3:1 to 19:1.

The coating is applied to a suitable packaging material, for example a polymer film formed from a polyamide, a polyethylene, a polypropylene, an ethylene-vinyl acetate co-polymer, a polyethylene terephthalate, a polystyrene, or a mixture, blend or co-polymer thereof. Preferably, the polymer film is an ethylene vinyl acetate, a low-density polyethylene, a high-density polypropylene, a biaxially orientated polypropylene, polyamide or a high impact polystyrene.

The zeolite material in the coating is preferably in the form of particles, which typically have a size (d50) of 1 µm to 25 µm, preferably 5 and 10 µm. The particle size distribution of particles included in the coating composition may be measured, for example, by laser diffraction, for example by generating a suspension of particles in deionised water and measuring the particle size distribution using a Malvern Mastersizer 2000.

The zeolites as described herein may be used to generate packaging films. The packaging films may be a single polymer layer, or may comprise a laminate structure of two or more layers which may be the same or different materials.

In one arrangement, the packaging film comprises or consists essentially of a single layer of polymer film in which particles of the zeolite are dispersed.

In a further arrangement, the packaging film comprises a single polymer film layer which has a coating applied on one or both surfaces of the film, the coating comprising particles of the zeolite and a polymeric binder.

In another arrangement, the packaging film comprises two or more polymer film layers, the packaging film having at least one layer in which the zeolite particles are dispersed. It will be understood by the skilled person that in the case in which the packaging films comprise at least three layers, the layer or layers in which the zeolite particles are dispersed is preferably an exterior layer of the packaging film. Such packaging films may be formed, for example, by an extrusion or lamination process.

In yet another arrangement, the packaging film comprises two or more polymer film layers, at least one of which is provided with a coating applied to at least one outer surface of the packaging film, the coating comprising particles of the zeolite and a polymeric binder.

Typically, the packaging films will have a thickness of between 5 µm to 200 µm, preferably 10 to 100 µm, more preferably 15 to 40 µm. If a coating is applied, then the coating layer has a typical thickness (i.e. the average binder thickness in the coating layer) of 0.1 to 5 µm.

The packaging film may additionally comprise a gas-permeable barrier layer, for example a silicone rubber, or other synthetic or natural rubber material, which may improve the stability of the packaging film and which may be advantageous in particular for food or other consumable packaging applications, for instance the gas-permeable barrier layer can prevent particulate additives included in the polymer matrix from migrating to the film surface, and therefore prevent contact between the additives and the packaging contents. The barrier layer may be applied by a coating process, a lamination process or by extrusion during a film blowing process.

The packaging films may additionally comprise an anti-fog additive. Such additives are known to those skilled in the art, and may comprise a detergent and/or a surfactant.

The zeolites and packaging materials as described herein may be advantageously used for the adsorption of VOCs. The VOCs may be, for example, plant growth regulators such as ethylene, odorous species such as ammonia, or acetic acid, and other by-products of produce decomposition such as trimethylamine.

The zeolites and packaging materials as described herein may be advantageously used for the adsorption of VOCs originating from organic matter, such as fruit, vegetables, cut flowers, or other foodstuffs. The VOC is typically ethylene. In particular, the zeolites and films may be used for the adsorption of ethylene originating from climacteric produce, such as bananas, avocados, nectarines, melons and pears which release a burst of ethylene during ripening, accompanied by an increase in respiration. Other non-climacteric produce types which are sensitive to ethylene include potatoes, onions, broccoli, cabbage and cut flowers.

Typically, the organic matter is contained in a packaging structure during storage and transportation, such as a crate, bag, bottle, box or punnet. The zeolites and packaging materials may therefore be advantageously used to control ethylene levels within such packaging structures.

The packaging materials may be used to seal the packaging structure, for example to seal a punnet, bottle or a box, or may, for example, form the majority of the packaging structure, such as in the case of a bag, or packaging film may be used to wrap produce or wrap containers of produce, such as boxes.

It will be understood by the skilled person that in the case of multi-layer or coated packaging films the layer incorporating zeolite particles, or the coating layer, is typically presented to the interior of the packaging structure enabling the control of the atmospheric composition within the structure. It may be envisaged however that the outermost layer of the packaging film may alternatively or in addition incorporate zeolite particles, or be coated with a layer incorporating zeolite particles, in order to adsorb VOCs generated externally to the packaging structure, for example during transportation.

The packaging structure may comprise a polymer film that is perforated, for example with holes or slits which are typically 50-500 μm in diameter or length as appropriate. Such perforations may be formed by laser perforation. In use, the degree of perforation may be used to control the gaseous composition within the packaging structure once produce has been placed inside, leading to a lower oxygen content. Such a packaging structure may be known as modified atmosphere packaging. Both unmodified and modified atmosphere packaging structures may be used with packaging films as described herein.

It should be noted that the term "adsorbent" and "adsorption" as used herein should not be construed as being limited to the uptake of VOCs to a particular route and includes the chemical conversion of VOCs into secondary compounds. As used herein, the term "adsorbent" is synonymous with "absorbent".

The expression "consists essentially" as used herein limits the scope of a feature to include the specified materials, and any other materials or steps that do not materially affect the basic characteristics of that feature, such as for example minor impurities. The expression "consists essentially of" embraces the expression "consisting of".

EXAMPLES

The invention is now illustrated with the following non-limiting examples:

Example Preparation of Palladium-Doped Zeolites

1% Pd-doped H-chabazite (SAR=22): Samples were prepared by incipient wetness impregnation. Pd nitrate (~8%) solution was weighed out to give the desired weight % of metal on the zeolite. The Pd nitrate solution was then diluted with water up to around 60-70% pore fill of the zeolite. The solution was added to the zeolite powder (obtained from Tosoh Corporation) using a pipette and every few drops added the solution was manually stirred and 'wet lumps' were broken up using a spatula to keep the sample as homogenous as possible. The sample was then dried at 105° C. (2 hr) and then calcined at a temperature of 500° C. for 2 hrs with a 10° C./min ramp rate.

The samples of 1% Pd-doped H-ZSM-5 (SAR=23) and 0.4% Pd-doped H-beta zeolite (SAR=28) were prepared according to the described method with the following changes to conditions: (i) The Pd nitrate solution was diluted with water up to around 95% pore fill of the zeolite; (ii) the drying time was 18 hr.

Example Preparation of Polymer Masterbatches Incorporating Pd-Doped Zeolites

A twin screw extruder (Dr Collin) was used to compound Pd-doped zeolite particles with the selected polymer. Twin screw compounding speed was 20 rpm with a set temperature between 120 and 180° C. The compounded material was then pelletised into a masterbatch.

Example 1—Preparation of Ethyl-Vinyl Acetate Films Incorporating Pd-Doped Zeolite Particles with Different Framework Types A twin screw extruder (Dr Collin) was used to compound ethylene-vinyl acetate (EVA FL00209) with Pd-doped zeolite particles with different framework types as described above at a temperature of 130° C. The zeolite and polymer addition rates were adjusted so as to result in a film with around 1.5 wt % palladium-doped zeolite. The compounded mixtures were then extruded through a blown film line to produce multilayer structures (20 μm), using the following conditions:

Inner layer (EVA):
Extrusion speed: 25 rpm
Temperature profile from feeding zone to die adaptor (° C.): 30, 130, 130, 130, 130
Middle layer (EVA):
Extrusion speed: 25 rpm
Temperature profile from feeding zone to die adaptor (° C.): 30, 130, 130, 130, 130
Outer layer (EVA+absorbent):
Extrusion speed: 50 rpm
Temperature profile (° C.) from feeding zone to die: 30, 130, 130, 130, 130, 130 and 130

The zeolite loading in the produced films was confirmed by an ash test. The test involved heating a sample of the films to 500° C. for 5 hours. The zeolite loading was then calculated using the formula:

$$\text{Zeolite loading} = \text{Net ash}/\text{Net film} * 100\%$$

According to the film ash test results, the tested film had a zeolite loading as follows:
Pd-Chabazite—1.57 wt %;
Pd-ZSM-5—1.45 wt %;
Pd-beta—1.89 wt %;

Testing of Polymer Films

A series of experiments were conducted to evaluate the ethylene removal performance of different palladium-doped zeolites to compare their performance after incorporation into the polymer film vs as a powder.

Ethylene Uptake Measurement

A film containing ca. 0.2 g zeolite was prepared and placed into a sealed 1990 ml jar.

Ethylene gas was injected into the jar and reached 500 ppm. The inner atmosphere in the jar was analysed at regular intervals. The concentration of ethylene was determined by GC analysis. Temperature and humidity in the jar were maintained at 5° C. and RH 90-95% during the test.

Results

FIG. 1 shows the results of ethylene adsorption testing. 1% Pd-chabazite (SAR 22) was found to remove ethylene continuously over the period of the study with a high removal rate, and with a particularly advantageous profile in comparison with the other framework types tested.

Figure 2:
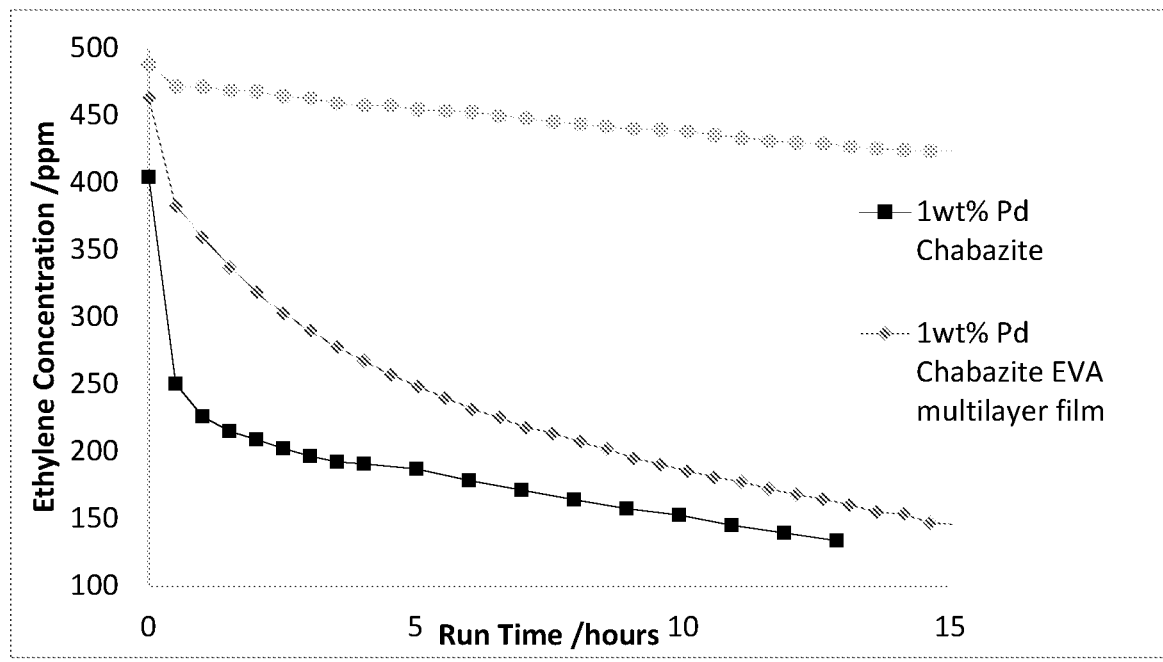
FIG. 2 shows the results of ethylene adsorption testing of 1% Pd-doped chabazite in the form of a powder and incorporated into a multi-layer film.

Example 2—Comparison of the Ethylene Removal Capacity of the Multi-Layer Polymer Film Incorporating Pd-Doped Chabazite Particles and Pd-Doped Chabazite Powder 0.2 g of 1% Pd-Chabazite powder and an EVA multilayer film incorporated with 0.199 g of 1% Pd-Chabazite powder were prepared as described in example 1. The ethylene removal performance of both were evaluated in the ethylene uptake test, at wet and low temperature conditions (5° C. and RH90~95%), which can mimic food storage conditions. The ethylene removal performance of the multilayer film was shown in FIG. 2. It was found the film retained around ca. 80% activity of the zeolite powder.

Example 3—Preparation and Testing of a LDPE Polymer Film

A twin screw extruder (Dr Collin) was used to compound low density polyethylene (Lupolen 3020H) with 1% Pd-doped chabazite particles to form a masterbatch as described above at a temperature of 160° C. The zeolite and polymer addition rates were adjusted so as to result in a film with around 2 wt % palladium-doped zeolite. The compounded mixture was then extruded through a blown film line to produce multilayer structures (20 μm), using the following conditions:
Inner layer (LDPE):
Extrusion speed: 25 rpm
Temperature profile from feeding zone to die adaptor (° C.): 30, 160, 160, 160, 160
Middle layer (LDPE):
Extrusion speed: 25 rpm
Temperature profile from feeding zone to die adaptor (° C.): 30, 160, 160, 160, 160
Outer layer (LDPE+absorbent):
Extrusion speed: 50 rpm
Temperature profile (° C.) from feeding zone to die: 30, 160, 160, 160, 160, 160, 160 and 160

According to the film ash test results, the tested film had a zeolite loading as follows:
Pd-Chabazite—2.08 wt %
Testing of Polymer Films A series of experiments were conducted to evaluate the ethylene removal performance of different palladium-doped zeolites to compare their performance after incorporation into the polymer film vs as a powder.
Ethylene Uptake Measurement A film containing 0.208 g zeolite was prepared and placed into a sealed 1990 ml jar. Ethylene gas was injected into the jar and reached 500 ppm. The inner atmosphere in the jar was analysed at regular intervals. The concentration of ethylene was determined by GC analysis. Temperature and humidity in the jar were maintained at 5° C. and RH 90-95% during the test.

Ethylene Uptake: The LDPE film and zeolite powder (control=1% Pd-chabazite powder) were tested for ethylene uptake as described above Results The ethylene removal performance of the LDPE multi-layer film was shown in FIG. 3. It was found the film retained around ca. 60-70% activity of the zeolite powder.

Example 4—Preparation and Testing of a Polymer Film with a Polymeric Coating Incorporating Pd-Doped Chabazite Particles An ink was prepared by the addition of polyvinylpyrrolidone (1 wt %) to a stirring suspension of 1% palladium-doped chabazite particles (10 wt %). The ink was sprayed onto a polyamide PA6 film (Xtend). The film was then dried using a hot plate (100° C.) for 10 minutes. The coating of the substrate was 0.25 g per 150 mm×150 mm of film. The particle size (D50) was 6.4 μm.

Ethylene Uptake: The coated film (coated Xtend) and 0.25 g zeolite powder (control=1% Pd-chabazite powder) were tested for ethylene uptake as described above.

Results: As shown in FIG. 4 the coated film removed the majority of the ethylene with a significant reduction of the ethylene concentration in the first 2 hours of the experiment.

The invention claimed is:

1. A packaging material for the adsorption of volatile organic compounds, the material comprising a polymer film with a coating on the surface of the polymer film, wherein the coating comprises particles of a palladium-doped zeolite and a polymeric binder, wherein the zeolite has a chabazite framework type.

2. The packaging material according to claim 1, wherein the polymer film is selected from an ethylene vinyl acetate film, a low-density polyethylene film, a high-density polypropylene film, a polypropylene film, or a high impact polystyrene film.

3. The packaging material according to claim 1 wherein the zeolite comprises 0.2 to 2 wt % palladium based on the total weight of doped zeolite.

4. The packaging material according to claim 1 wherein the zeolite has a silica to alumina molar ratio (SAR) of less than or equal to 100:1.

5. A packaging material according to claim 1, wherein the packaging material comprises a single polymer film layer which has the coating applied on one surface of the film.

6. A packaging material according to claim 1, wherein the packaging material comprises a single polymer film layer which has the coating applied on both surfaces of the film.

7. A packaging structure comprising a packaging material according to claim 1.

8. The packaging material according to claim 1 wherein the palladium-doped zeolite is in the hydrogen form.

9. An ink for application to a packaging material, the ink comprising palladium-doped zeolite particles and a polymeric binder, wherein the zeolite has a chabazite framework type.

10. An ink according to claim 9, wherein said polymeric binder is water-soluble and a weight ratio of palladium-doped zeolite to water-soluble binder is 3:1 to 19:1.

11. A method of adsorbing volatile organic compounds using a palladium-doped zeolite, wherein the zeolite has a chabazite framework type and is polymer-bound.

12. The method according to claim 11 wherein the volatile organic compounds originate from organic matter.

13. The method according to claim 11 wherein particles of the palladium-doped zeolite are dispersed within a polymeric packaging material.

14. The method according to claim 11 wherein particles of the palladium-doped zeolite are incorporated in a coating on a surface of a polymeric packaging material, the coating comprising a polymeric binder and the palladium-doped zeolite particles.

15. The method according to claim 11 wherein the volatile organic compound is ethylene.

* * * * *